(No Model.)

E. F. MORSE.
ROLLER BEARING.

No. 507,153. Patented Oct. 24, 1893.

WITNESSES:

INVENTOR:
Everett F. Morse

1
UNITED STATES PATENT OFFICE.

EVERETT F. MORSE, OF TRUMANSBURG, NEW YORK.

ROLLER-BEARING.

SPECIFICATION forming part of Letters Patent No. 507,153, dated October 24, 1893.

Application filed June 9, 1893. Serial No. 477,080. (No model.)

*To all whom it may concern:*

Be it known that I, EVERETT F. MORSE, a citizen of the United States, residing at Trumansburg, in the county of Tompkins and State of New York, have invented a new and useful Improvement in Oscillating Joints, of which the following is a specification.

My invention, which relates to joints in which the connected parts do not revolve through a full circle relatively to each other, but oscillate through a limited angle, has for its object, to reduce the friction and wear of the joint without the use of lubricants, and consists of a simple device whereby, in the working of the joint, the bearing surfaces are subjected to rolling friction only. I attain these objects by the mechanism illustrated in the accompanying drawings in which—

Figure 1:
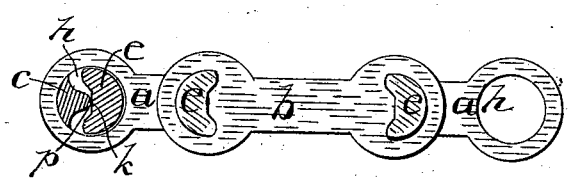
Figure 2:
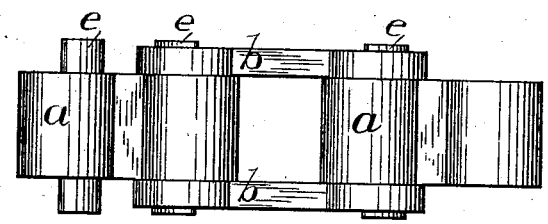
Figure 3:
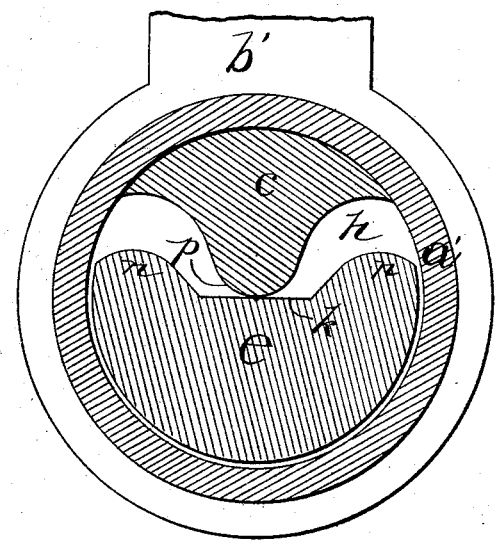

Figure 1, is a side elevation of a part of a driving chain having the links connected by my oscillating joints. Fig. 2, is a plane view of the same, and Fig. 3, is a transverse sectional view of my joint in its generic form.

While I have shown my invention as applied to driving chains, it is equally well adapted to other oscillating joints. These chains are usually run in an endless form on sprocket wheels mounted respectively on a driving and a driven shaft. As the successive links mount and leave the sprocket wheels, they turn through a limited angle relatively to the links on the sprocket wheels next to them. The joints between the links are often subjected to great pressure and consequent wear, which causes the chain to elongate and mesh badly on the sprocket wheels. The friction and necessary lubrication of these joints when the chain is run on such machines as bicycles, are also very objectionable. It is the object of my present invention to obviate largely or entirely all these objections which are common to oscillating joints used in connection with other devices.

Referring to Figs. 1 and 2, $a, a$, are central links and $b, b$, side links of a driving chain arranged as usual and providing an opening between them to receive the teeth of the sprocket wheels. The central links are provided with two cylindrical holes, one near each end of the link. Through each of these holes, two pins, $c$ and $e$, of unequal lengths are passed. While the longer of these pins $e$, extends through both the central and side links, the other pin $c$, is no longer than the width of the central link within which it is wholly contained. Holes are also provided in the ends of the side links $b$, which are not round but correspond in shape and size with the cross section of the longer pins $e$. The side links $b$, are held in position close beside the central links $a$, by the pins $e$. For this purpose, the holes in the side links are made to tightly fit the pins $e$, which may have their ends upset to still more securely restrain the side links in their place.

My oscillating joint is applicable to a large range of joints used in various mechanisms. In Fig. 3, showing a cross section of my joint, the essential features are the same as in the chain shown in Figs. 1 and 2, but the parts $a'$ and $b'$, connected by the joint are generic in form. In general use the form of these parts can be readily changed and adapted to the particular mechanism to which the joint is applied while still retaining the features adapting them to my oscillating joint. These features are simply a cylindrical hole $h$, provided in part $a'$, and a hole in part $b'$, corresponding in shape and size to the cross section of the seat pin $e$, into which this pin projects and is securely held, substantially as in links $b$, Figs. 1 and 2.

The rolling pin $c$, contained within the hole $h$, has a segmental circular cross section, having one side of same curvature as the surface of hole $h$, against which it rests as shown. The seat pin $e$, has also a segmental circular cross section, being somewhat larger than a semi-circle. The radius of curvature however of this pin is somewhat smaller than the radius of hole $h$, to allow for its free rolling motion within said hole.

The principal feature of the seat pin is the substantially plane surface $k$, arranged perpendicular to the forces of the joint and parallel to and near the axis of hole $h$, for the rolling pin to roll upon. With the object of providing ample transverse strength, the portions $n, n$, reinforcing the otherwise semi-circular form of the pin $e$, are added to its cross section.

The principal feature of the rolling pin $c$, is the curved surface $p$, whose center of curvature is located off the middle of the plane surface $k$, against which this curved surface rolls. From this curved surface, the sides of the rolling pin $c$ curve outward thus providing a larger base to bear against the walls of hole $h$. The spaces between the rolling and seat pins are adjusted in amount to permit of the desired angular motion of the joint.

Sidewise movement within the cylindrical hole $h$, of the seat pin $e$, as it rolls about the rolling pin is almost entirely avoided by locating the center of the rolling surface $p$, when the joint is in the position shown in Fig. 3, a distance somewhat greater than its radius of curvature above the center of hole $h$, so that the center of hole $h$, when the joint is in the position shown, is below the surface $k$. When the center of the rolling surface $p$, is properly located in this respect, the center of hole $h$, moves in a path substantially perpendicular to surface $k$, as the joint is worked, thus attaining the desired end.

The angular motion of any two adjoining links relatively to each other is oscillatory, turning one way as the links meet a sprocket wheel and the opposite way as they leave the wheel. The operation of my joint in providing for this oscillatory motion in drive chains or any other mechanism to which the joint may be applied, is as follows:—The seat pin $e$, is restrained to turn with the parts of the joint into which its ends project—that is, in the case of the chain with the side links $b$; and the rolling pin $c$, turns with the other part of the joint—that is, in the case of the chain with the central links. Now, as the joint is worked, the rolling and seat pin roll against each other, thus the friction of the joint is entirely reduced to rolling friction and, as the bearing surfaces are true, smooth and perfectly elastic within the pressure to which the joint is subjected, the working of the joint is effected with a very small degree of friction and without need of lubrication. If desired, the rolling pin $c$, can be held in its proper position in the central links or in part $a'$, by any suitable means as, for example, a small pin made to project from the rolling pin into the part $a'$, or the central link $a$.

What I claim as new, and desire to secure by Letters Patent, is—

1. The combination with the parts connected by an oscillating joint, of a seat and a rolling pin, one of said pins being longer than the other and securely attached to one of said connected parts and extending through a suitable hole provided in the other of said parts, the shorter of said pins being arranged within said hole at one side of the longer pin, said pins being provided, one with a substantially plain bearing surface parallel to its length near the middle of said hole and facing the other pin, the other with a curved rolling surface pressing against the bearing surface of the other pin, substantially as described.

2. The combination with the parts connected by an oscillating joint, of a seat pin securely attached to one of said connected parts and extending through a suitable hole provided in the other of said parts, said seat pin having a substantially plane bearing surface parallel to its length and facing the force of the joint; a rolling pin arranged within said hole at one side of said seat pin, said rolling pin having a curved rolling surface, bearing against the bearing surface of the seat pin and a suitable base opposite said curved surface to bear against the walls of said hole, substantially as described.

3. The combination with the parts connected by an oscillating joint, of a seat pin securely attached to one of said connected parts and extending through a cylindrical hole provided in the other of said parts, said seat pin having a plane bearing surface parallel to its length and facing the force of the joint; a rolling pin arranged within said cylindrical hole at one side of said seat pin, said rolling pin having a curved rolling surface pressing against the bearing surface of the seat pin, sides extending from said curved surface and a curved base opposite to said rolling surface fitting and bearing against the walls of said cylindrical hole, substantially as described.

4. In a driving chain composed of alternate central and side links, a seat pin having its ends held firmly in the side links and extending through the central links, said seat pin having a substantially plane bearing surface perpendicular to the length of the side links; a rolling pin arranged within the central links at one side of the seat pin and having a curved rolling surface pressing against the bearing surface of the seat pin, and a suitable base opposite said curved surface bearing against the walls of the hole containing it, substantially as described.

5. In a driving chain composed of alternate central and side links, said central links having cylindrical holes in each of their ends, two pins arranged within each of said holes side by side, one of said pins being longer than the other and extending through the side links, said pins being provided, one with a plane bearing surface and the other with a curved bearing surface arranged to roll, one on the other, substantially as described.

EVERETT F. MORSE.

Witnesses:
CHANNY P. GREGG,
FRANK. L. MORSE.